United States Patent [19]

Watts et al.

[11] Patent Number: 4,588,858
[45] Date of Patent: May 13, 1986

[54] DIFFERENTIAL AMPLIFIERS AND METHOD OF DIFFERENTIALLY DRIVING A TWO-WIRE LINE CIRCUIT

[75] Inventors: Kevin P. Watts, Sunningdale; Jeffrey I. Robinson, Henlow, both of England

[73] Assignee: Texas Instruments Incorporated, Dallas, Tex.

[21] Appl. No.: 407,517

[22] Filed: Aug. 12, 1982

[30] Foreign Application Priority Data

Aug. 19, 1981 [GB] United Kingdom ............... 8125348
May 28, 1982 [GB] United Kingdom ............... 8215791

[51] Int. Cl.$^4$ ............................................. H04M 3/00
[52] U.S. Cl. .............................. 179/16 AA; 330/260
[58] Field of Search ............... 179/2 C, 81 B, 16 AA, 179/16 EA, 18 FA, 170 NC, 170.6; 381/120, 121; 330/258, 260, 253, 257

[56] References Cited

U.S. PATENT DOCUMENTS

| 3,444,472 | 5/1969 | Johnson | 330/258 |
| 3,786,362 | 1/1974 | Marsh et al. | 330/258 |
| 3,984,780 | 10/1976 | Hsiao et al. | 330/260 X |
| 4,192,978 | 3/1980 | Vincent | 179/81 B X |
| 4,232,271 | 11/1980 | Dobkin et al. | 330/258 |
| 4,359,609 | 11/1982 | Apfel | 179/16 F |

FOREIGN PATENT DOCUMENTS

| 532793 | 1/1941 | United Kingdom . |
| 864806 | 4/1961 | United Kingdom . |
| 868018 | 5/1961 | United Kingdom . |
| 989171 | 4/1965 | United Kingdom . |
| 1111571 | 5/1968 | United Kingdom . |
| 1140593 | 1/1969 | United Kingdom . |
| 1420936 | 1/1976 | United Kingdom . |
| 1563179 | 3/1980 | United Kingdom . |
| 2087199 | 5/1982 | United Kingdom . |

OTHER PUBLICATIONS

A High-Voltage IC for a Transformerless Trunk and Subscriber Line Interface, Denis W. Aull, Member, IEEE, D. Alan Spries, Paul C. Davis and Stanley F. Moyer, IEEE Journal of Solid-State Circuits, vol. SC-16, No. 4, Aug. 1981.

Primary Examiner—W. J. Brady
Attorney, Agent, or Firm—Melvin Sharp; James T. Comfort; N. Rhys Merrett

[57] ABSTRACT

An amplifier for differentially driving a two wire line has two output terminals for connection to the line. The differential voltage on the line is monitored and a negative-feedback voltage derived therefrom is combined with the input signal voltage. This combination is applied to a reference impedance. The resulting current in this impedance controls the current fed to the line. In one embodiment the control is direct via controlled current sources for example precision current mirrors and in another embodiment a current mirror controls the current to one wire and the current to the other wire is controlled indirectly via circuitry arranged to maintain equal voltage excursions on the two wires of the line.

11 Claims, 7 Drawing Figures

DIFFERENTIAL AMPLIFIERS AND METHOD OF DIFFERENTIALLY DRIVING A TWO-WIRE LINE CIRCUIT

This invention relates to amplifiers and more specifically but not exclusively to an amplifier forming part of a semiconductor subscriber's line interface circuit (SLIC) for driving a telephone line.

In a telephone exchange each subscriber's line is terminated by a subscriber's line interface unit which receives signals from the transmits signals to the subscriber's line. This circuit conventionally includes a hybrid transformer. Transformers are, however, bulky and expensive and attention recently has focussed on the use of transistor circuitry in place of transformers.

The main signal requirements to be met by a semiconductor SLIC and the test to measure the performance in respect of each requirement are as follows.

a. It should present a defined impedance ($Z_T$) to the subscriber's line. A measure of the accuracy to which it does this is given by the Return Loss test, a circuit for which is shown in FIG. 5 of the accompanying drawings. In this test circuit $R51/R52=1\pm0.05\%$, $Zx$=impedance of the Test Network $\pm0.05\%$. In operation, signal voltage and source $V_{51}$ is set to, say, 0dBm and the return loss is given by $20 \log V_{51}/2V_{52}$ dB, where $V_{52}$ is the signal voltage and measured between the junction of the impedance Zx and the SLIC and the junction between the resistors R51 and R52.

b. It should have a low common-mode-signal to differential-signal conversion coefficient at its output. Performance in this respect is measured by a signal test known as the $L_1$ test, a circuit for which is shown in FIG. 6 of the accompanying drawings. This circuit consists of a pair of matched 300 ohm resistors R61, R62 connected in series across the terminals of the SLIC. A signal V61 is applied between the junction of these resistors and earth potential and the resultant voltage V62 across the terminals of the SLIC is measured. R61 and R62 should be matched so that $R61/R62=1\pm0.00001$. The performance L1 is given by the expression $L1=20 \log |V61/V62|$.

c. The signal on the output ports of the SLIC should have a high degree of signal balance about earth. Performance in this respect is measured by the $L_2$ test, a circuit for which is given in FIG. 7. This circuit consists of a pair of 300 ohm resistors R71 and R72 connected in series across the output part of the SLIC. A signal voltage V71 is applied across the output part of the SLIC and the voltage 72 developed between the junction of the resistors R71 and R72 and earth is measured. The L2 performance is given by the expression $L2=20 \log |V71/V72|$.

An object of the present invention is to produce an amplifier suitable for use in a semiconductor line interface circuit based on the requirements set out above.

According to a first aspect of the present invention there is provided an amplifier having a differential output suitable for differentially driving a two wire line, including an input circuit, a pair of output terminals, a reference impedance, feedback means connected to each of the output terminals and to the input circuit for monitoring the voltage on the output terminals and deriving therefrom a negative-feedback signal representing the differential voltage on the output terminals and for so applying the negative-feedback signal together with the signal at the input circuit to the reference impedance as to cause a signal to appear across the reference impedance dependent on an additive combination of the feedback signal and the signal on the input circuit, and output drive means including two controlled current sources coupled to the reference impedance and to the respective output terminals to apply respective currents, each being in proportion to the current flowing in the reference impedance, in respective opposite senses, to the output terminals.

According to a second aspect of the present invention there is provided a differential amplifier capable of high common mode rejection performance having two inputs and an output impedance means connecting one input to one of a pair of terminals, means connecting the other input to the other terminal means, means connecting the output to said one input to provide negative feedback for maintaining operation of said amplifier in a linear region such that the voltage on said other input substantially equals the voltage on said one input, said output means also providing a path for connecting current through said impedance means produced by a voltage across said terminals.

According to a third aspect of the present invention there is provided a method of differentially driving a two wire line including the steps of
monitoring the line and producing a negative feedback signal proportional to the differential voltage on the line,
applying across a reference impedance an arithmetic combination of the negative feedback signal and an input signal,
Feeding the current in the reference impedance to controlled current generator means for generating and applying to currents to respective wires of the line, each said generated current proportional to the current in the reference impedance and in opposite senses.

A telephone line drive amplifier embodying the invention will now be described by way of example only making reference to the accompanying drawings in which.

Figure 1:
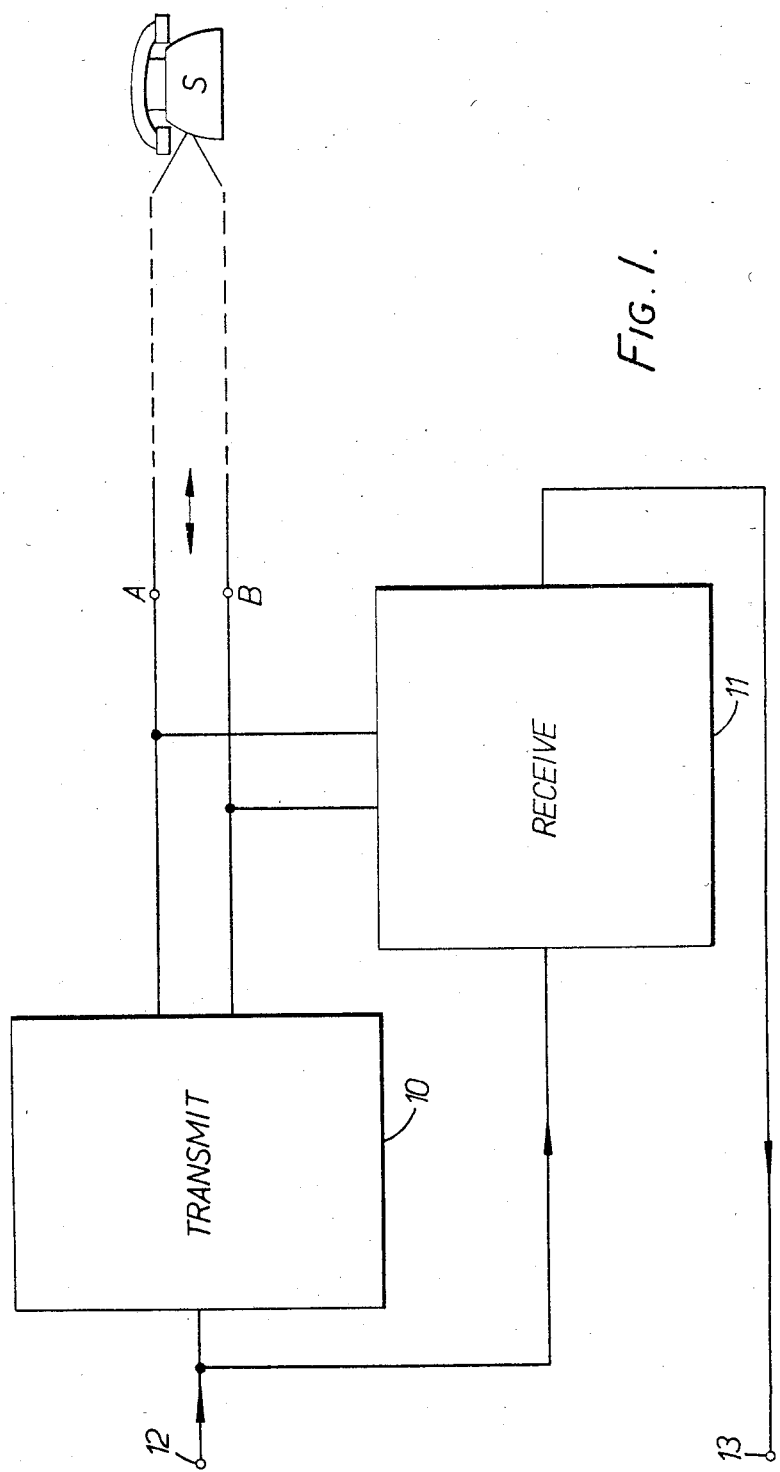
FIG. 1 is a block diagram of a subscriber's line interface unit.

Referring to FIG. 1, a subscribers's line interface unit consists of a transmit circuit 10 connected to subscriber's line terminals A,B for transmitting speech signals over the line to a subscriber's telephone instrument in response to a speech signal on an input terminal 12. Also connected to the subscriber's line terminals A,B is a receive circuit 11 which receives any speech signal originating from the subscriber's instrument S and produces a corresponding speech signal on an output terminal 13. The receive circuit 11 also takes a signal from the input terminal 12 of the transmit circuit 10 to enable it to eliminate or reduce side tone.

In addition to producing a speech signal the transmit circuit 10 also feeds a constant current to the line to power the subscriber's instrument S.

Figure 2:
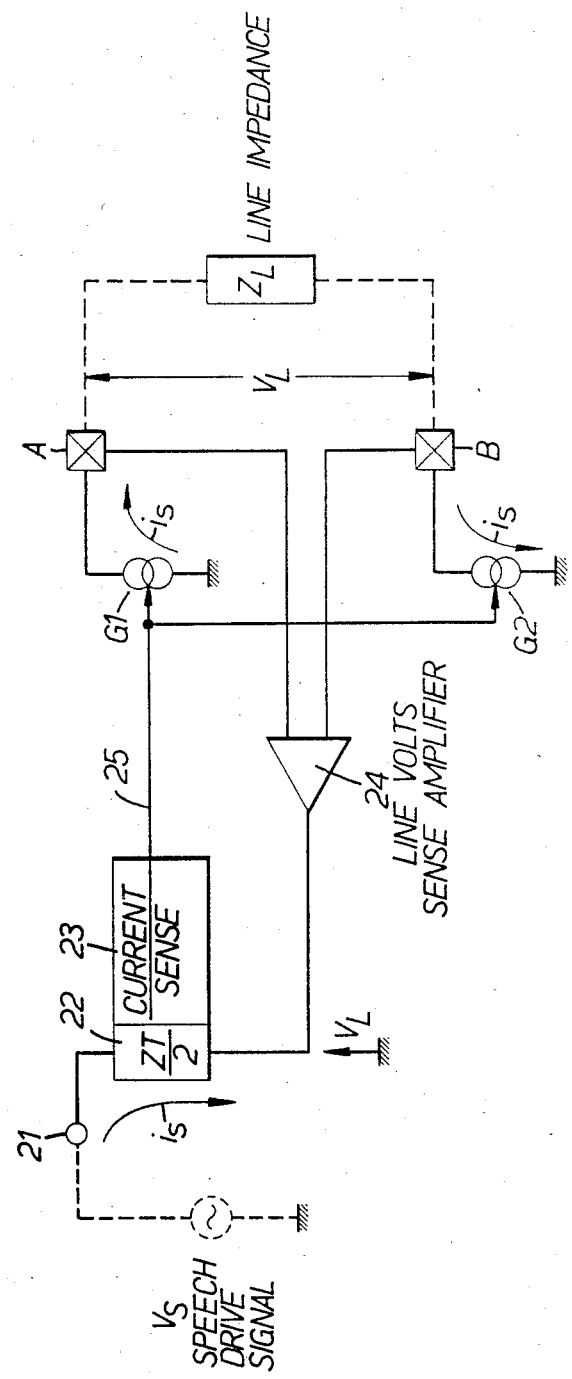
FIG. 2 is a simplified schematic diagram of a transmit unit suitable for use in the arrangement of FIG. 1.

Referring to FIG. 2 a differential amplifier for use in the transmit unit 10 of FIG. 1 includes an input terminal 21, which may be fed by speech signal from the telephone network. Coupled to the input terminal is one terminal of a reference impedance 22 and a current sense circuit combination 23.

The differential amplifier produces output signals on output terminals A and B which in turn may be connected to drive the A and B wires of the telephone line. Coupled to each of output terminals A and B is an input of a line voltage sense amplifier 24 that is arranged to produce an output proportional to the differential voltage on the output terminals. The output of the sense amplifier 24 is connected to the other terminal of the reference impedance 22.

The current sense circuit 23 produces an output on a line 25 which is in turn coupled to each of a pair of controllable current sources G1 and G2 of opposite senses, and connected respectively to the output terminals A and B. In practice the current sources G1 and G2 may be precision current mirrors.

In operation the line sense amplifier 24 monitors the differential signal between the output terminals A and B and produces an output signal $V_L$ which is substracted from the incoming speech signal on the input terminal 21 at the reference impedance 22. The current flowing in this impedance is accurately monitored by the current sense circuit 23 and is differentially reflected into the output terminals A and B by the controlled current sources G1 and G2. An advantage of this arrangement is that the output impedance of the amplifier is controlled by the value of the precision reference impedance 22, scaled by a factor dependent on the gain of the other circuit components. Also the simplicity of construction ensures that the desired return loss specification is achievable with realistic component tolerances. Furthermore the common mode signal to differential conversion ratio and the signal balance about earth (i.e. L1 and L2 performance) are only limited by the accuracy of the two controlled current sources G1 and G2, which may be precision current mirrors.

Figure 3:
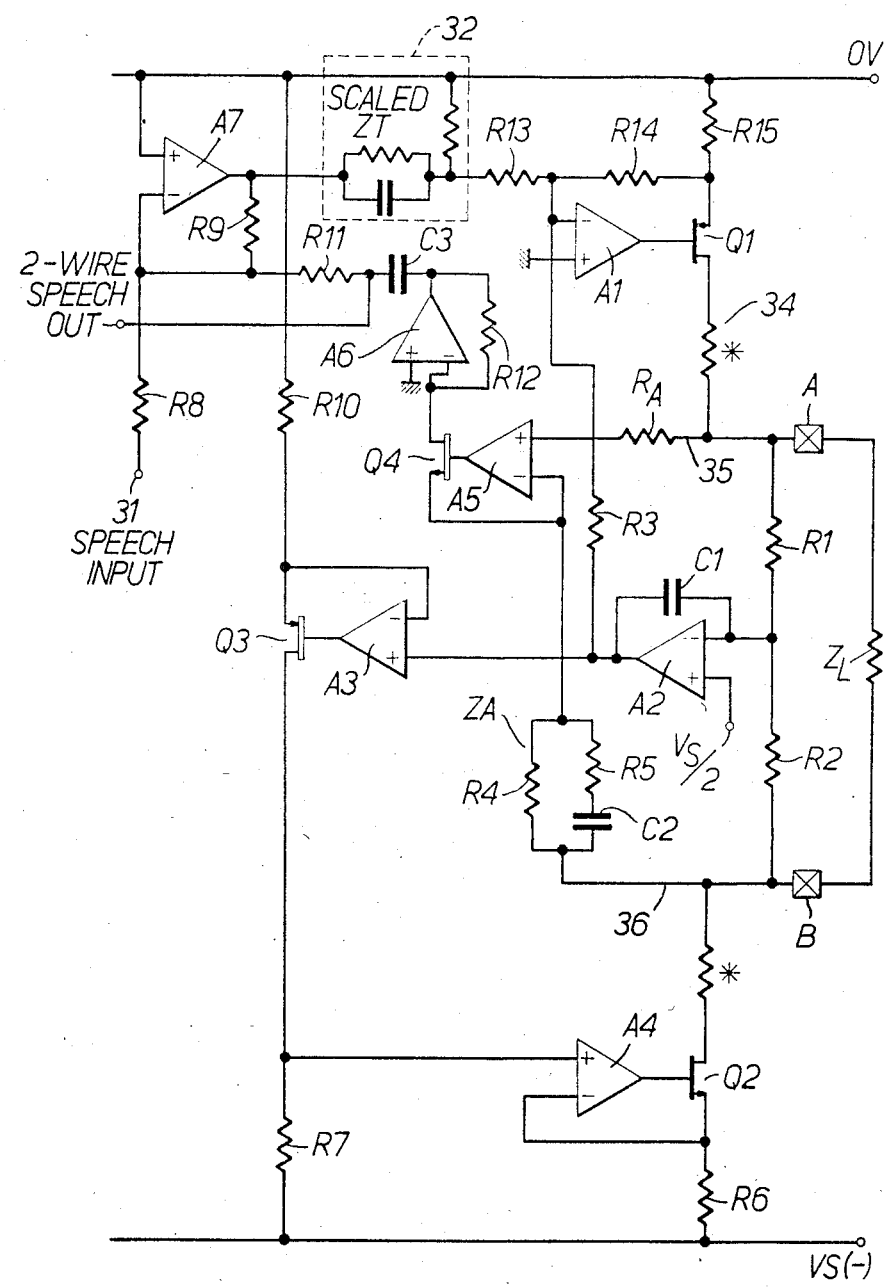
FIG. 3 is another schematic diagram a transmit unit suitable for use in the arrangement of FIG. 1.

Referring to FIG. 3 a subscriber's line interface circuit has an input terminal 31 connected via an input resistor R8 to the summing junction of an amplifier A7. This summing junction is also fed by a negative feedback path via a resistor R11 and a capacitor C3. This feedback path consists of amplifiers A5 and A6, a transistor Q4 and associated components.

The output of the amplifier A7 is connected to earth via a reference impedance network 32. The current flow in this network is sensed by an output amplifier combination A1 Q1 and which reflects it at the output terminal A via a lightning protection resistor 34.

The output terminal B is driven by an output combination A4 Q2 one input of which is connected via an amplifier combination A3 Q3 to the output of differential input amplifier A2. The output of amplifier A2 is also connected via a resistor R3 to the output drive amplifier combination A1,Q1 feeding the output terminal A.

The functions of the amplifier A2 and the feedback loops consisting of amplifiers A1, A2 and A2, A3, A4 is to ensure that the sum of the voltages on the output terminals A and B is at all times equal to a reference value i.e. there are equal and opposite excursions on the output terminals. Such an arrangement is the subject of co-pending Patent Application No: 80.33477 published as No. 2087199A). For best common mode rejection the gains of the feedback loops A1, A2 and A2, A3, A4 should be equal. In the course of ensuring equal and opposite excursions on the output terminals the amplifier A2 via the path including the amplifiers A3 and A4 ensures that a current in proportion to current in the reference impedance is applied to the output terminal B.

The feedback path consisting of the amplifiers A5 and A6 and the transistor Q4 has two input conductors 35 and 36. The input conductor 35 is connected via a resistor RA to the non-inverting input of the amplifier A5. The other input conductor 36 is connected via an impedance network $Z_A$ to the inverting input of the amplifier A5. The output of the amplifier A5 is connected to the control electrode of a transistor Q4, the source electrode of which is connected to the inverting input. This provides unity negative feedback and ensures that the amplifier operates within its linear region. The drain electrode of the transistor Q4 is connected to the virtual earth of an inverting amplifier A6 having a feedback resistor R12 between its inverting input and its output.

In operation the feedback path operates as follows: As the inputs of the amplifier A5 essentially take no current the voltage appearing on the non-inverting input of the amplifier A5 is the same as the voltage on the input conductor 35. The amplifier A5 is a very high gain amplifier working within its linear region, so the voltage on the inverting input must be substantially equal to the voltage on the non-inverting input.

Accordingly, the differential voltage between the input conductors 35 and 36 appears across the impedance $Z_A$. This causes a current to flow that is proportional to this differential voltage. The current cannot flow through the inverting input of the amplifier, so it flows in the local feedback path of the amplifier A5 and through the transistor Q4. This current is unaltered as it passes through the transistor Q4, which has substantially zero current flowing in its control electrode. From there the current passes to the virtual earth point of the amplifier A6. This produces a voltage on the output terminal of the amplifier A6 equal to the product of the current and the feed-back resistor R12.

The combination of amplifiers A5, A6 and the transistor Q4 thus produce a differential voltage sensing amplifier in which the gain is controlled solely by the impedance network ZA and the resistor R12, and is inherently equal for the signal on both input conductors. This circuit thus has an extremely good common mode signal rejection performance which does not rely on the accurate matching of impedances.

Referring to FIG. 3 as a whole, the components identifiable to the return loss performance are as follows:
 (i) the accuracy of 2 wire speech sense signal determined by precision of R12 and R5 in FIG. 3
 (ii) the accuracy of the speech drive signal minus the 2 wire speech sense signal as determined by the accuracy of R8 and R11
 (iii) the accuracy of $Z_T$ defining the impedance
 (iv) the accuracy of A wire transconductance stage as determined by the precision of R13, R14 and R15
 (v) the accuracy of the balance of the A and B wire current sources (refer to L2 loop)

The components identifiable to the L2 performance are the matching of sense resistors R1 and R2 and the loop gain assigned to this balancing loop. Error amplifier A2 provides compensation of the loop. Symmetric loading of the A and B wires to earth is also an important consideration in achieving good L2 performance.

The components identifiable to the L1 performance involve the matching of the two signal paths from A2 error amplifier output to the currents flowing into the A and B wires. This involves only 3 pairs of precision matched resistors (i.e. R6, R7, R10, R3, R14, R15).

It is evident that the configuration allows an excellent L2 performance essentially determined by the matching of R1 and R2 (60 dB with resistors matched to 0.1%). L1 performance is essentially the matching of 3 pairs of resistors, R7 to R10; R14 to R3 and R6 to R15 50 dB with matching to 0.1%). Return loss performance is most degraded due to the number of components determining the $Z_T$ sythesis. However, this is usually the most generously specified of the 3 performance factors.

Figure 4:
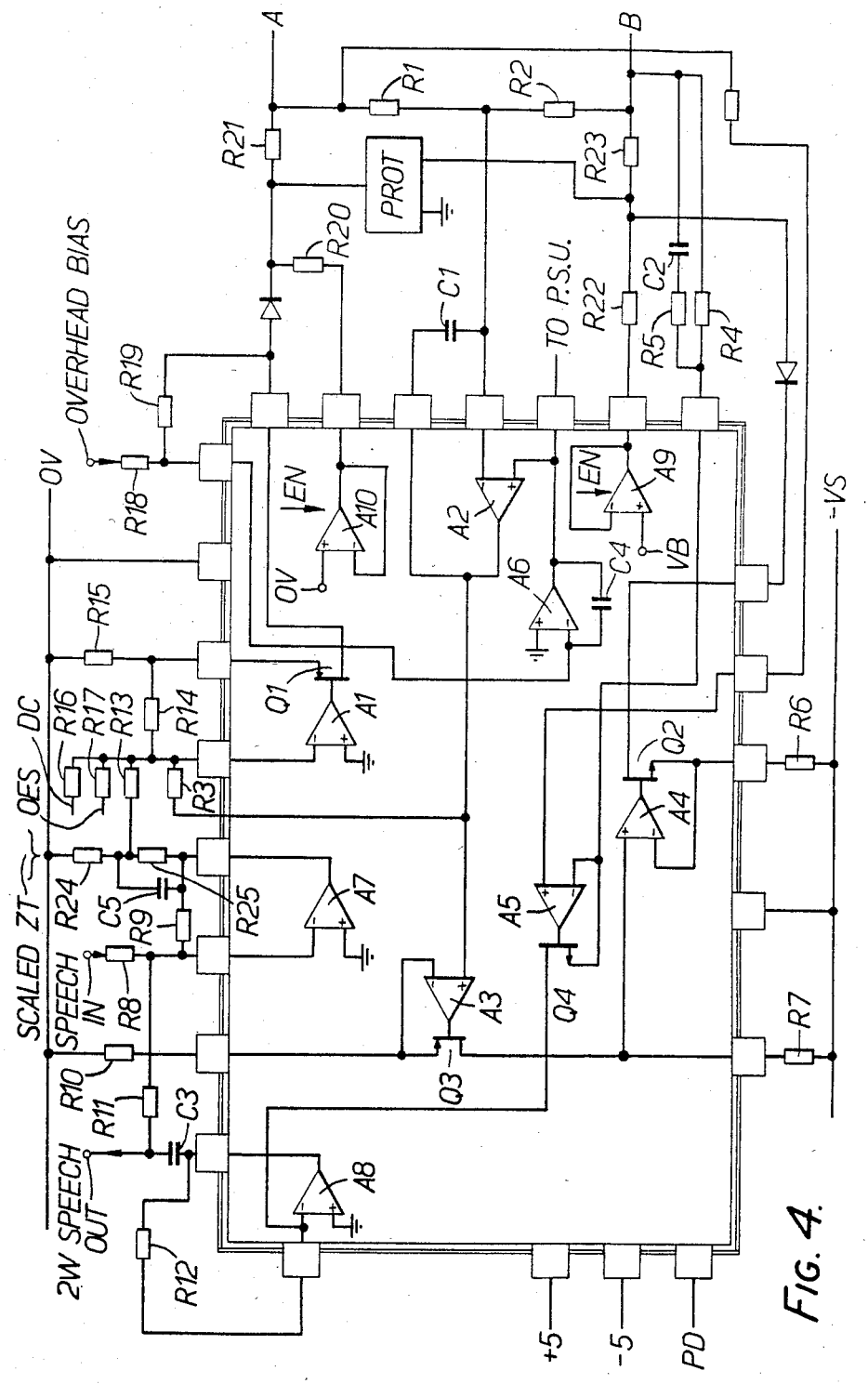
FIG. 4 is a diagram showing the arrangement of FIG. 3 implemented using an integrated circuit.
Figure 5:
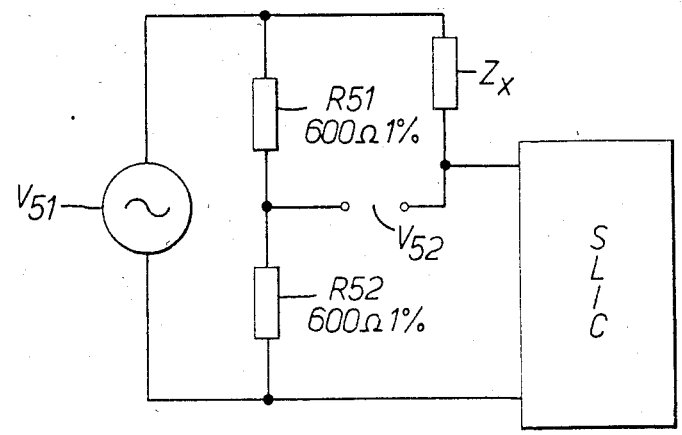
FIGS. 5, 6 and 7 are circuit diagrams of various test circuits.
Figure 6:
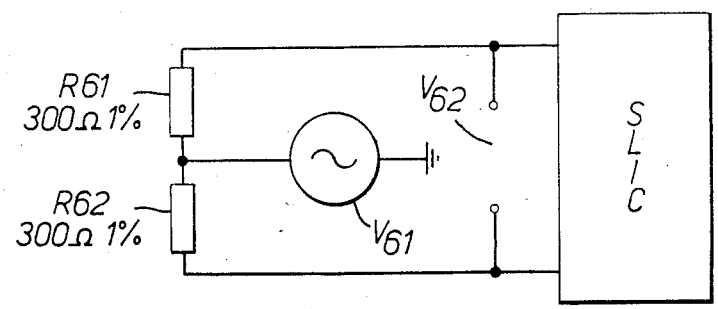
Figure 7:
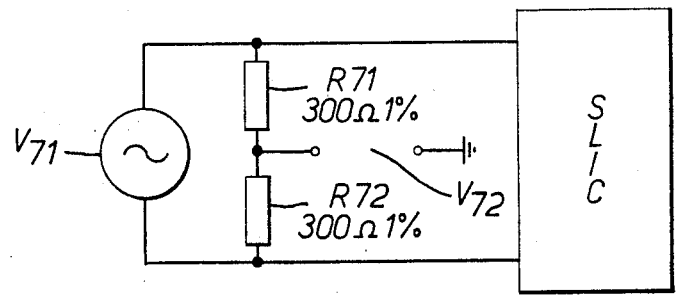

FIG. 4 shows how the arrangement of FIG. 3 may be implemented in integrated circuit form.

Typically the integrated circuit may be manufactured by the BIDFET process. This process allows the construction on the same chip of field-effect and bipolar transistors. The amplifiers A1 to A10 employ a mixture of bipolar and field effect transistor constructions. The transistors Q1 to Q4 are double diffused MOS transistors, sometimes known as DMOS. These typically will have a $V_{DSO}$ of 200 Volts. Use of this high voltage technology enables the integrated circuit to drive a telephone line without the need for output buffer amplifiers.

The invention has wider application than in telephone line drive amplifiers and may also be used for example in high quality audio amplifiers, servo systems, control systems for automatic plant, and the like.

It is also envisaged that an electrical dual of the circuit would be within the scope of the invention i.e. where currents are replaced by voltages and vice-versa.

What is claimed is:

1. An amplifier having a differential output and an input circuit, a pair of output terminals, a reference impedance, feedback means connected to each of the output terminals and to the input circuit for monitoring the voltage on the output terminals and deriving therefrom a negative-feedback signal representing the differential voltage on the output terminals and for so applying the negative-feedback signal together with an input signal at the input circuit to the reference impedance as to cause a signal to appear across the reference impedance dependent on an additive combination of the feedback signal and the input signal on the input circuit, and output drive means including two controlled current sources coupled to the reference impedance and to the respective output terminals to apply respective currents, each being in proportion to the current flowing in the reference impedance, in respective opposite senses, to the output terminals.

2. An amplifier according to claim 1 wherein the feedback means includes a high common mode rejection performance difference amplifier having two inputs coupled to respective ones of the output terminals, means connecting the differential amplifier output to one of the differential amplifier inputs and to control impedance means connected to one of the output terminals so that a differential voltage on the output terminals causes a current flow through the said control impedance means in proportion to said differential voltage and production to the feedback signal in proportion thereto.

3. An amplifier according to claim 2 wherein the high common mode rejection performance amplifier includes a differential high gain amplifier one polarity input of which is coupled via said control impedance means to said one output terminal and the other polarity input of which is coupled to be held at the potential of the other output terminal, and local feedback means coupled around the high gain amplifier for maintaining said differential high gain amplifier in its linear range of operation, and means for feeding said negative feedback signal to the reference impedance.

4. An amplifier according to claim 3 wherein the local feedback means includes a high current gain transistor having a control electrode connected to the output of the differential high gain amplifier, and the transistor has another electrode connected to the inverting input of said differential amplifier and to the control impedance means, and inverter means coupling a further electrode of the transistor to the input circuit for additive combination of the negative feedback signal and the input signal.

5. An amplifier according to claim 4 wherein the input circuit includes a high gain amplifier having a summing junction for receiving said input signal and said negative feedback signal, the high gain amplifier having an output connected to the reference impedance to supply an additive combination of the input signal and the negative feedback signal thereto.

6. An amplifier according to claim 1 wherein the output drive means includes a respective output amplifier coupled to each of the output terminals and monitoring means coupled to each of the output terminals for monitoring the voltage at the output terminals and for deriving therefrom an error signal representing the difference between the sum of the voltages on the output terminals and a reference potential for so feeding the error signal to each of the output amplifiers to cause a voltage shift at the output terminals in a sense to bring the sum closer to the reference potential.

7. An amplifier according to claim 6 wherein for one output amplifier the current proportional to the current flowing in the reference impedance is controlled via the monitoring means and for the other output amplifier it is controlled directly.

8. A method of differentially driving a two wire line including the steps of monitoring the line and producing a negative feedback signal proportional to a differential voltage on the line, applying across a reference impedance the arithmetic combination of the negative feedback signal and an input signal, feeding the current in the reference impedance to controlled current generating means for generating and applying two currents to respective wires of the lines, each said generated current proportional to the current in the reference impedance and in opposite senses.

9. An amplifier including first and second differential amplifier stages each having two inputs and an output; impedance means connecting one input of the first stage to one of a pair of terminals; means connecting the other input of the first stage to the other terminal; a field effect transistor having a source-drain current path and a control electrode; the first stage output connected to the control electrode and one end of the source-drain current connected to the said one input of the first stage to provide negative feedback for maintaining operation of said first stage in a linear region such that the voltage on said other input substantially equals the voltage on said one input; the other end of said source-drain current path connected to an inverting input of the second stage, the other input of the second stage connected to a reference potential; negative feedback resistor means connecting the output of the second stage to said inverting input of the second stage; and the field effect transistor providing a path for conducting current through said impedance means produced by a voltage across said pair of terminals.

10. An amplifier according to claim 9, wherein the field effect transistor has a source connected to the inverting input of the first stage to provide said negative feedback and a drain connected to the inverting input of the second stage.

11. A current amplifier comprising a differential amplifier having a inverting input, a non-inverting input and an output; a field effect transistor having a control electrode and a source-drain current path; the amplifier output connected to the control electrode; one end of the source-drain current path of the field-effect transistor connected by a series resistive impedance to provide negative feedback to one of the said inputs of the differential amplifier; a series input resistor connected for providing a current input to said one input of the differential amplifier; and means for connecting the other input of the differential amplifier to an input signal.

* * * * *